E. D. MACKINTOSH.
CENTRIFUGAL MACHINE UNLOADER.
APPLICATION FILED JAN. 22, 1914.
1,102,530.
Patented July 7, 1914.
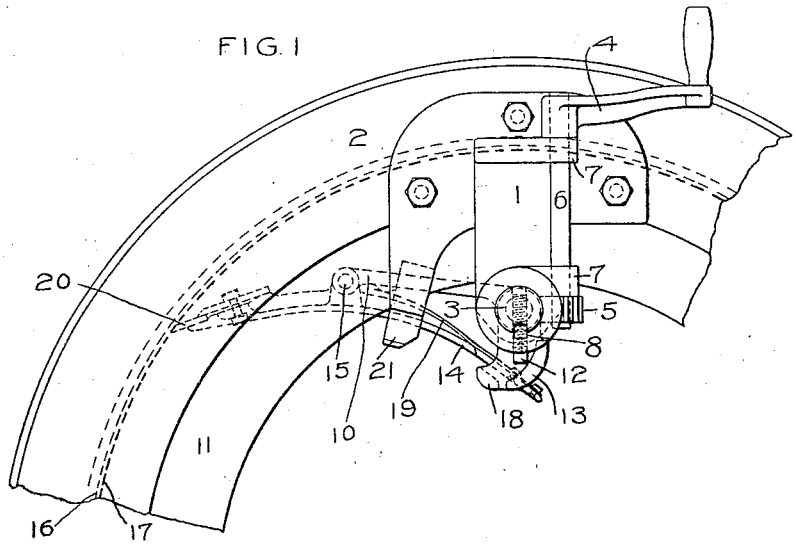
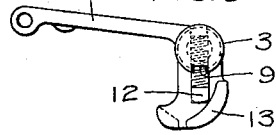
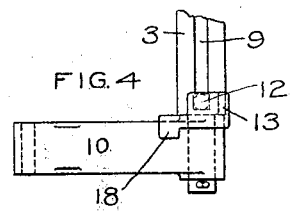
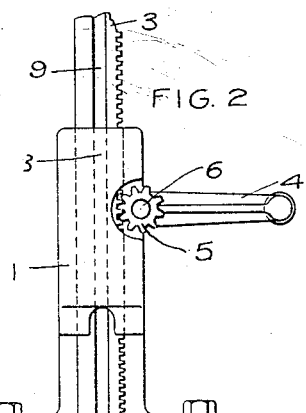
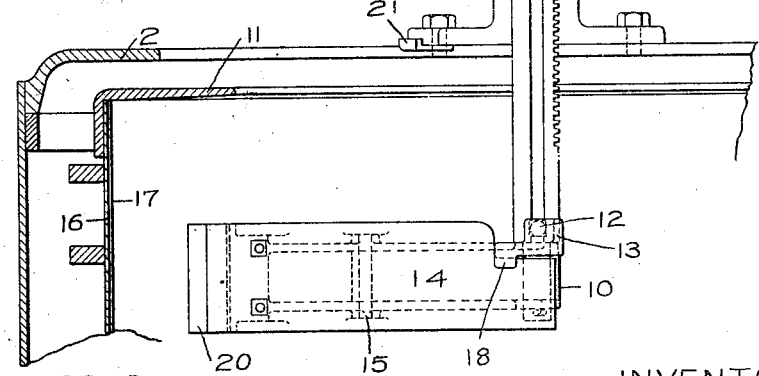
WITNESSES
INVENTOR
Edward D. Mackintosh

UNITED STATES PATENT OFFICE.

EDWARD D. MACKINTOSH, OF NEW YORK, N. Y., ASSIGNOR OF ONE-HALF TO S. S. HEPWORTH COMPANY, OF NEW YORK, N. Y., A CORPORATION OF NEW YORK.

CENTRIFUGAL-MACHINE UNLOADER.

1,102,530. Specification of Letters Patent. Patented July 7, 1914.

Application filed January 22, 1914. Serial No. 813,634.

*To all whom it may concern:*

Be it known that I, EDWARD D. MACKINTOSH, of the borough of Brooklyn, in the city of New York, county of Kings, and State of New York, have invented certain new and useful Improvements in Centrifugal-Machine Unloaders, of which the following is a specification.

It is the object of my invention to unload sugar and other materials from centrifugal machines without excessive injury to the linings with which their baskets are ordinarily provided.

Referring to the accompanying drawings, forming part of this specification: Figure 1 is a top plan of my unloader in place on a centrifugal machine. Fig. 2 is an elevation of the same. Figs. 3 and 4 are details of some of the parts.

A bracket 1, secured to the top 2 of the outer casing of a centrifugal machine, forms a support for a vertical bar 3. This bar is movable vertically by means of a winch 4 and a toothed pinion 5 engaging with teeth on the bar, the winch and the pinion being secured to a shaft 6 journaled in ears 7 that form part of the bracket. The vertical bar is kept from turning by means of a feather 8 fitting in a groove 9 in the bar and secured in the bore of the bracket.

An arm 10 is pivoted to the lower end of the bar in a manner to swing outwardly and partly under the top 11 of the basket of the centrifugal machine and away from thereunder. The extent to which it can swing outwardly is variable and is limited by two stops, one being a screw 12 threaded into the vertical rod, and the other a lug 13 forming part of the arm. The extent to which the arm can swing outwardly is varied by turning the screw. To the arm, at a point where it is extendible under the basket top, is pivoted a plow 14, by means of a pin 15, and in a manner to swing into and out of contact with the wall 16 of the basket of the centrifugal machine or its lining 17. The extent to which the plow is swingable on the arm is limited by a stop 18, a spring 19 tending to keep the one against the other. The plow is ordinarily made of metal except that its tip 20, that bears against the basket lining, is of some softer non-metallic material, as wood, or vulcanized fiber. When the plow is not in use it is supported above the basket on a bracket 21.

To set and use the unloader the screw 12 is adjusted to stop the metallic part of the plow just short of swinging into contact with the basket lining when the non-metallic tip wears away. The plow is lowered into the basket and entered in the contents thereof while the basket is turning slowly in a direction to cause the said contents to impinge on the plow's concave face. So impinging they swing both the plow and the arm in a direction away from the center of the centrifugal machine until the lug 13 strikes the screw 12 and the tip of the plow strikes the basket lining. The contents then travel along the plow and leave it at the inner end, falling through the discharge opening regularly provided in such machines as my device is designed to unload.

It is to be noted that, in traveling along the plow, the material pressing against its outer end tends to force it against the basket lining but the material pressing against its inner end tends to lift it away therefrom. It is to be further noted, that the pin 15 can be so located that the resulting pressure of the plow on the lining will be very light and not excessively injurious. It is to be still further noted that, in order to obtain the desired result, the pivot pin may need to be so near the lining, while unloading is progressing, as to be under the basket top, but that it can not remain there during the drying of a basket full of material. Hence the need of the swingable arm.

Having now described my invention, what I claim as new, and desire to secure by Letters Patent, is:

1. In an unloader for centrifugal machines, an arm, means for holding the arm in the basket of a centrifugal machine and for adapting it to be extended out partly under the top of the basket or withdrawn from thereunder, and a plow pivoted to the arm at a point where the arm is extendible under the basket top, to swing into and out of contact with the wall of the basket or the lining thereof.

2. A bar extending into the basket of a centrifugal machine, means for supporting the bar, for preventing it from turning, and for moving it toward and from the basket bottom, an arm pivoted to the bar to swing partly under the top of the basket and away from thereunder, a stop on the arm coöperating with a stop on the bar to limit the swing of the arm outwardly under the basket top, and a plow so pivoted to such part of the arm as may be extended under the basket top as to swing into and out of contact with the wall of the basket or the lining thereof.

3. A bar extending into the basket of a centrifugal machine, means for supporting the bar, for preventing it from turning, and for moving it toward and from the bottom of the basket, an arm pivoted to the bar to swing partly under and away from under the top of the basket, and a stop on the arm, coöperating with a stop on the bar, to determine the extent to which the arm may swing outwardly under the top of the basket.

4. A bar extending into the basket of a centrifugal machine, means for supporting the bar, for preventing it from turning, and for moving it toward and from the bottom of the basket, an arm pivoted to the bar to swing partly under and away from under the top of the basket, a stop on the arm, coöperating with a stop on the bar, to determine the extent to which the arm may swing outwardly under the top of the basket, and means for varying the said extent.

In testimony whereof I have signed my name to this specification in the presence of two subscribing witnesses.

EDWARD D. MACKINTOSH.

Witnesses:
 FRANK J. CREED,
 B. VAN WARNE.